United States Patent [19]

Tang et al.

[11] Patent Number: 5,454,102

[45] Date of Patent: Sep. 26, 1995

[54] METHOD AND APPARATUS FOR TRANSFERRING STRUCTURED DATA USING A SELF-GENERATING NODE NETWORK

[75] Inventors: Hien Tang, Orange; Randy A. Cwikowski, Dana Point, both of Calif.

[73] Assignee: Canon Information Systems, Inc., Costa Mesa, Calif.

[21] Appl. No.: 5,770

[22] Filed: Jan. 19, 1993

[51] Int. Cl.$^6$ .................................................. G06F 17/30
[52] U.S. Cl. .................. 395/600; 364/974.2; 364/974.6; 364/DIG. 2
[58] Field of Search ..................................... 395/600, 650

[56] References Cited

U.S. PATENT DOCUMENTS

| | | | |
|---|---|---|---|
| 4,733,354 | 3/1988 | Potter et al. | 364/415 |
| 5,001,628 | 3/1991 | Johnson et al. | 395/600 |
| 5,151,989 | 9/1992 | Johnson et al. | 395/600 |
| 5,295,261 | 3/1994 | Simonetti | 395/600 |
| 5,325,527 | 6/1994 | Cwikowski et al. | 395/650 |

Primary Examiner—Thomas G. Black
Assistant Examiner—Peter Y. Wang

[57] ABSTRACT

A self-generating node network (or directed graph) which represents the structure and contents of structured data. The node network creates itself from a root node by querying the structured data for structural-type elements and data-type elements. In response to the query, the root node builds one of two types of nodes: a list node and a data node. Data nodes are built in response to queries indicating data-type elements, and they store pointer tags to pieces of data in the structured data. List nodes are built in response to queries indicating structural-type elements. List nodes can build and contain further list nodes and data nodes, and they store a list of the nodes that they contain. Communication within the node network is carried out only between directly adjacent nodes, that is, between a parent node and a child node. Commands issued to the network, such as commands to write out the node network, are issued to the network via the root node. If the root node cannot execute the command, it relays the command to nodes it contains which, in turn, either executes the command or relays the command further into the network. Likewise, commands from within the network, such as commands from a list node to query the structured data, are relayed upwards to a parent node which, in turn, either executes the command or relays the command further upward in the network.

52 Claims, 7 Drawing Sheets

METHOD AND APPARATUS FOR TRANSFERRING STRUCTURED DATA USING A SELF-GENERATING NODE NETWORK

BACKGROUND OF THE INVENTION

1. Field of the Invention

The present invention pertains to a method and apparatus for transferring structured data using a self-generating node network such that the structure of the data is preserved. More specifically, the invention is a process that maps structured data information to and from an unstructured file by building a network of nodes, each of the nodes having specialized functions and capabilities including the capability to build further nodes in the network or to store and manipulate data.

2. Description of the Related Art

As the amount of data stored by computers increases, increasingly complex data structures have been created to contain that data and to organize the data in meaningful ways. For example, in the message communication field, structured data may be provided to represent a multimedia message which is addressed to multiple recipients. Multimedia messages include audio, image, text, binary and other types of component documents mixed together in a single message. Accordingly, a data structure to store multimedia messages may include, for example, an address structure and a document structure. The address structure may, in turn, contain recipient structure which, for each recipient, may include name, address and telephone access numbers. Likewise, the document structure may, in turn, contain message component structure which, for each message component, may include message component type and message contents.

Examples of structured data may be found in virtually any field, for example, in the business field (structured data storing corporate organization and employee data), banking (structured data correlating branch office information with banking accounts), brokerage (structured data which organizes security holdings), and so on.

As data structures become more complex, it is more and more difficult to transfer the data in the data structure such that the structure is preserved. For example, a bit-for-bit transfer of an exact image of the structured data will preserve the structure only if the recipient of the image knows how the data is stored and how to reconstruct that structure. Structure will not be preserved if the recipient does not know how to recreate the structure from the image, for example, which bits represent structure and which bits represent data. Accordingly, it has not heretofore been possible to transfer structured data such that the structure of the data is preserved unless both the sender and the recipient have pre-agreed on the format by which the data will be transferred.

SUMMARY OF THE INVENTION

It is an object of the invention to address the foregoing difficulties.

According to the invention, a node network (or directed graph) which represents the structure and contents of structured data creates itself from a root node by querying the structured data for structural-type elements and data-type elements. In response to the query, the root node builds one of two types of nodes: a list node and a data node. Data nodes are built in response to queries indicating data-type elements, and they store pointer tags to pieces of data in the structured data. List nodes are built in response to queries indicating structural-type elements. List nodes can build and contain further list nodes and data nodes, and they store a list of the nodes that they contain.

Communication within the node network is carried out only between directly adjacent nodes, that is, between a parent node and a child node. Thus, a list node can communicate only with the list nodes (or the data nodes) that the list node contains, and with the node that contains the list node. The root node, which is not contained in any node, communicates both with the structured data and with the output (or the input in the case where the node network is used to read serial data and transform it into structured data).

Commands issued to the network, such as commands to write out the node network, are issued to the network via the root node. If the root node cannot execute the command, it relays the command to nodes it contains which, in turn, either execute the command or relay the command further into the network.

Likewise, commands from within the network, such as commands from a list node to query the structured data, are relayed upwards to a parent node which, in turn, either executes the command or relays the command further upward in the network. Thus, for example, commands to query the structured data are passed up from a list node through the node network to the root node which is the only node which has the capability to communicate with the structured data.

Thus, the invention provides a method for creating a self-generating node network from structured data, the structured data having date-type elements and structural-type elements. According to the invention, a root node is built, the root node including communication capabilities with structured data and with an output (or an input) and being able to build data nodes which contain pointer tags to data in the structured data and being able to build list nodes which, in turn, can build and contain further list nodes and data nodes. Both the list nodes and the data nodes include communication capabilities with immediate parent and children nodes. The structured data is queried via the root node (or, in the case of input, the root node accepts an input), and further list nodes or data nodes are built in accordance with whether a data-type element or a structural-type element is encountered. In the case where a date-type element is encountered, a data node is built to store a pointer tag to the data-type element. In the case where a structural-type element is encountered, a list node is built which can issue further queries to the structured data via the root node (or accept further input via the root node). Each list node in the network queries the structured data and builds further list nodes or data nodes until all list nodes in the network terminate in data nodes, at which point all data in the structured data has been mapped onto the node network. A write command may then be issued to the root node. In response to the write command, the root node writes out a header and its contents to the output file and, in turn, instructs the children nodes to do the same. The write command is passed down through the network until all nodes have written themselves out via the root node. Selective writing is possible whereby only certain ones of the nodes, selected in accordance with a selection criteria, are written.

The output file is sent by the sender side to a recipient side, which builds a self-generating node network in response to detection of the root header. The recipient's node network is a facsimile reproduction of the sender's node network, but there is no requirement for the nodes in the recipient's node network to have the same processes and functions and capabilities as the sender's nodes so long as the recipient's list nodes and data nodes contain the basic functionality of the sender's list nodes and data nodes.

Because it is only necessary to recognize the node headers, there is no requirement for the recipient and the sender to have a pre-arranged data transfer format. In fact, the processes carried out by the recipient's node may be quite different from those of the sender's nodes, so long as data nodes in the recipient's node network store pointer tags to pieces of data, and so long as the list nodes in the recipient's network can build and contain further list nodes and data nodes and can store a list of nodes that they contain.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

Figure 1:
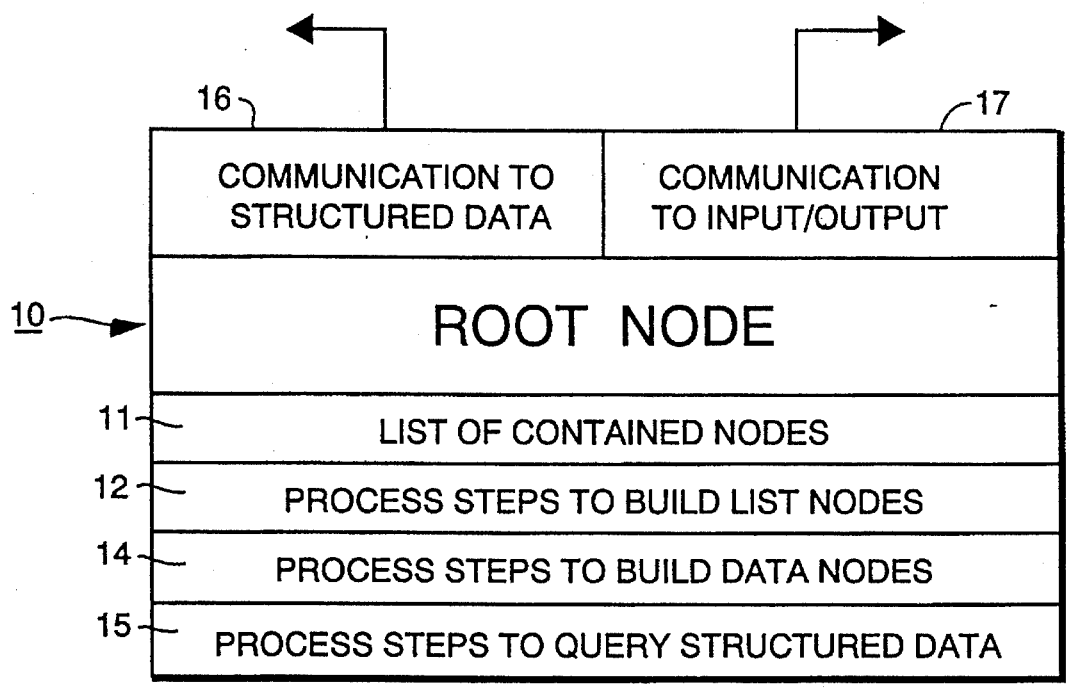
FIGS. 1, 2 and 3 are views for explaining the functional capabilities and data storing capabilities of root nodes, list nodes, and data nodes, respectively.
Figure 2:
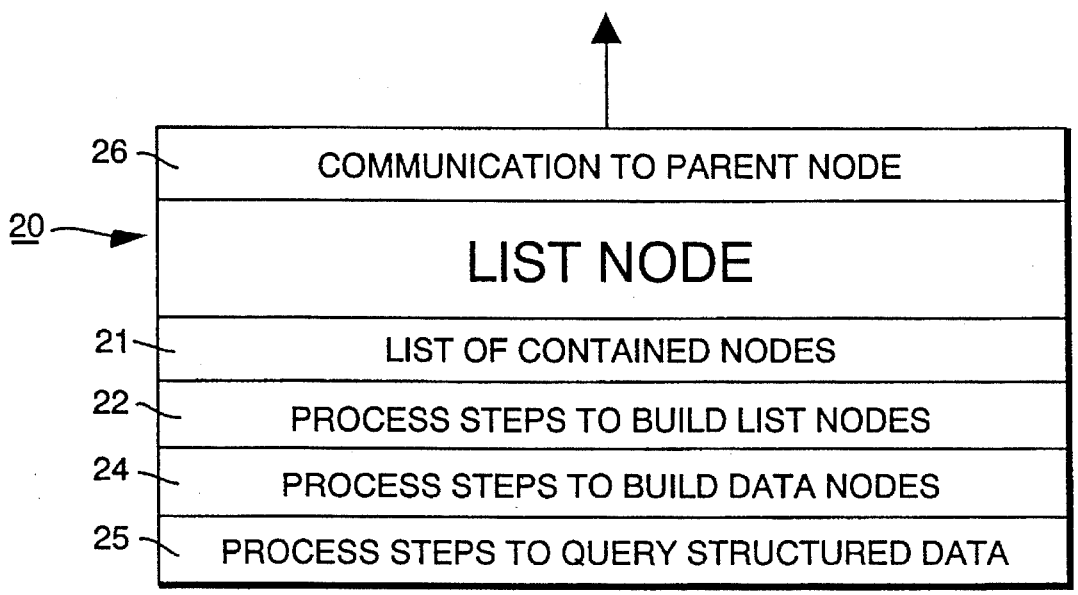
Figure 3:
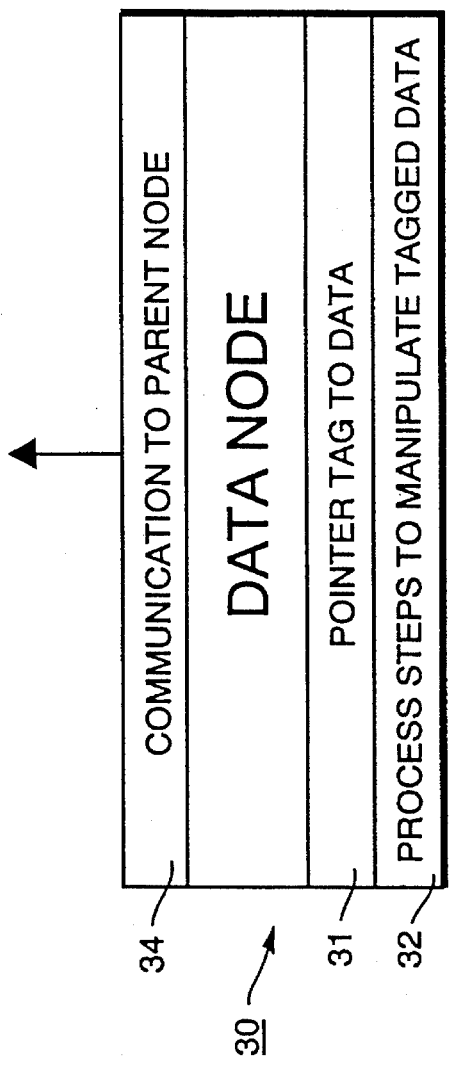
Figure 4:
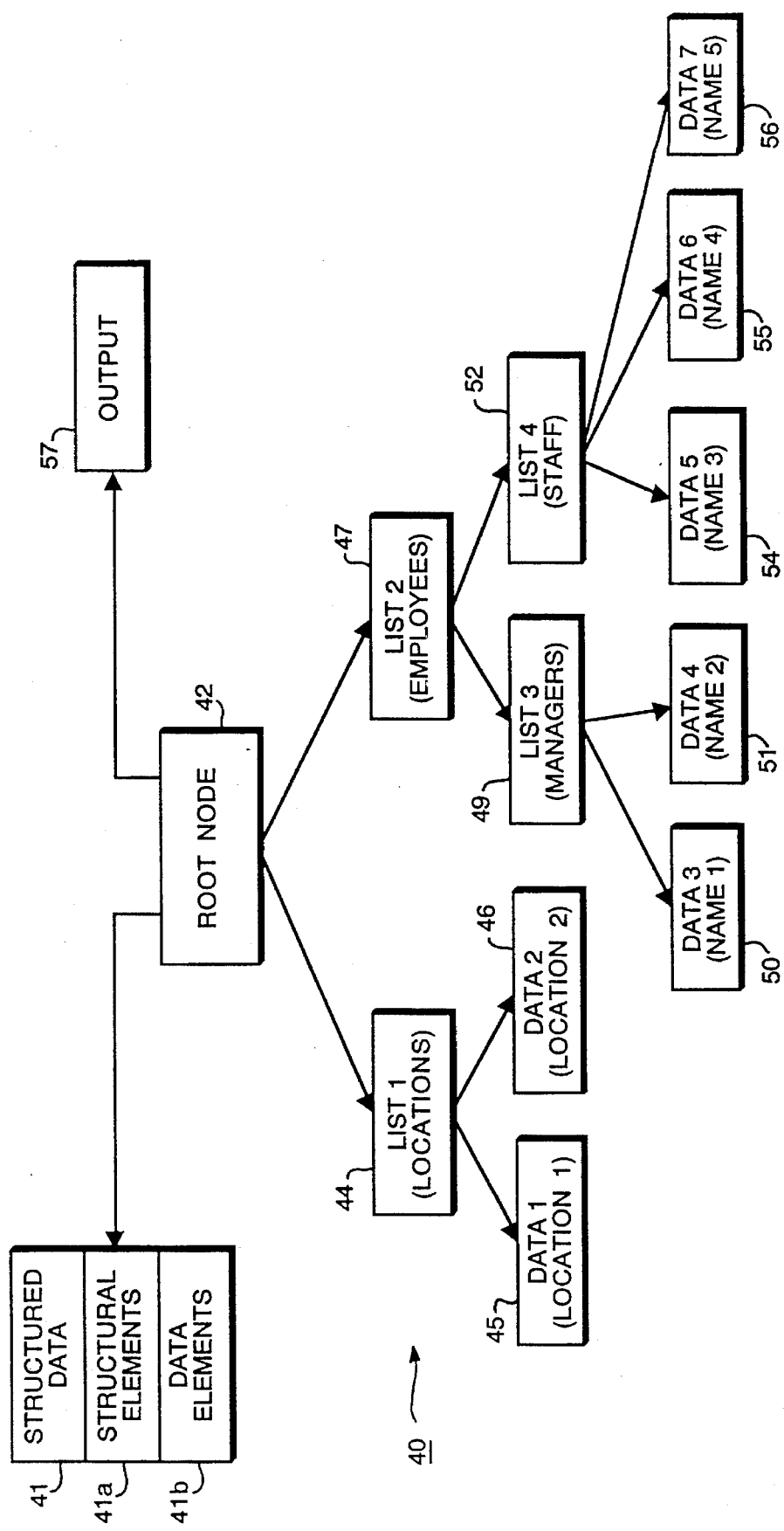
FIG. 4 is a representative view of a self-generating node network according to the invention.

A detailed description of the functional capabilities and data storage capabilities of a root node, a list node, and a data node, is given in connection with FIGS. 1, 2 and 3, respectively, and a representative self-generating node network constructed in accordance with the invention is shown in FIG. 4.

FIG. 1 is a representational view of a root node 10. As shown in FIG. 1, the root node is primarily a process but also contains a list 11 of nodes contained in the root. The process aspects of the root node include process steps 12 for building list nodes, process steps 14 for building data nodes, and process steps 15 to query the structured data. In addition, the root node 10 is provided with communication capabilities 16 for communicating to the structured data and communication capabilities 17 for communicating to input or output, depending on whether the network is to be used to generate output corresponding to structured data or to generate structured data from input. In most instances, the output will comprise an ordinary data file such as a RIFF file ("Resource Interchange File Format", a MicroSoft-defined file format used for storing data). It is, however, possible for the output to consist of a physical device, such as a modem for transmitting data or an optical storage device such as a laser card storage medium, thereby avoiding the need to form an intermediary file. Likewise, input may consist of a RIFF file or input from a physical device such as a modem, etc.

A list node 20 is shown in FIG. 2. As seen there, the list node is primarily a process but also contains a list 21 of nodes contained by the list node. The process aspects of the list node include process steps 22 for building additional list nodes, process steps 24 for building data nodes, and process steps 25 for querying the structured data. This list node 20 further includes communication capabilities 26 for communicating to the parent node. In this regard, because list node 20 does not include communication capabilities to the structured data, in response to process steps 25 to query the structured data, it is necessary for the list node 20, which does not include structured data communication capabilities, to pass the query request upward via the communication capabilities 26 to the parent node. The parent node will determine whether or not it is able to execute the requested query, and if it is not it will, in turn, pass the query request upward. Since the root node is the only node that can communicate with the structured data, the query request will be passed up until it reaches the root node, and the root node will execute the requested query on behalf of list node 20 and pass the results back to list node 20.

FIG. 3 shows the process capabilities and data storage capabilities of data node 30. As shown in FIG. 3, data node 30 is primarily a process, but it also contains a pointer tag 31 to data in the structured data. That is, pointer tag 31 is tag data that points to the location of data within the structured data. By using pointer tags rather than reproducing the data within the data node 30, it is possible to reduce memory storage requirements. Of course, it is also possible to store actual data within data node 30.

The process aspects of data node 30 include process steps 32 to manipulate the tagged data as well as process steps 34 to communicate with the parent node. Manipulation processes may include processes such as to change the format of the data, such as by compression or decompression or such as by optical character recognition of text stored in images of text.

Each of the root node 10, the list node 20 and the data node 30 may also include customized functions which are tailored to meet the specific properties of the structural elements or data elements to which they correspond in the structured data. For example, a list node that corresponds to an address structural element in structured data may include capabilities to recognize street addresses, city names, state names and zip codes. Likewise, a data node 30 may, as part of the process steps 32 to manipulate tagged data, include process steps to request the parent list node to form a new data node to contain the manipulated data. And in certain instances where access speed is needed, it may be possible for list nodes and data nodes to communicate directly with the structured data rather than via the root node, thereby bypassing the sequence of passing read or write requests up through the node network.

FIG. 4 is an illustration of a self-generating node network 40 which includes a root node, list nodes and data nodes such as shown in FIGS. 1, 2 and 3, and which is built in accordance with structured data 41 which includes structural elements 41a and data elements 41b. For purposes of the node network 40 illustrated in FIG. 4, the structured data 41 is assumed to have the following structural elements 41a and data elements 41b:

corporate locations:

```
location 1
location 2
employees:
    managers:
        name 1
        name 2
    staff:
        name 3
        name 4
        name 5
``` where: "corporate locations" and "employees" are structural elements, "managers" and "staff" are sub-structural elements under the "employee" structure, and "location 1", "location 2", "name 1", "name 2", "name 3", "name 4" and "name 5" are data elements which store the names of locations and employees.

To build self-generating node network 40, root node 42 is built and queries structured data 41 for information. If root node 42 encounters a structural-type element, then a list node corresponding to the structure is built; conversely, if a data-type element is encountered, then root node 42 builds a data node. In this instance, root node 42 first encounters a structural-type element, namely "corporate locations" and, consequently, builds list node 44 and updates its list of contained nodes accordingly.

List node 44 queries the structured data 41 (via root node 42 as described above), and encounters two data-type elements, namely "location 1" and "location 2". Consequently, list node 44 builds two data nodes 45 and 46 to contain those data elements, and updates its list of contained nodes accordingly.

Data nodes 45 and 46 each query the structured data via their parent node (here, via list node 44 and thence to root node 42) for the data to be stored in the respective data nodes. Pointer tags which point to the respective data type elements are returned to the data nodes and the data nodes store those tags.

In the self-generating node network of the present invention, data nodes are the final elements in the network. That is, they are the "leaves" of the network and do not contain further nodes. Accordingly, once list node 44 has created data nodes 45 and 46, it knows it has processed as much of structured data 41 as is possible for list node 44, and therefore returns control to its parent node, here root node 42.

Root node 42 queries structured data 41 and encounters a further structural element, namely "employees". Accordingly, root node 42 builds a list node 47 to contain the newly encountered structure, and updates its list of contained nodes to reflect the newly-built list node.

List node 47 then issues a query to structured data 41 (via root node 42 as discussed above) and encounters further structure, namely the "managers" structure. Accordingly, list node 47 creates a further list node 49 to contain the managers structure, and updates its list of contained nodes to reflect the newly built list node.

List node 49 queries the structured data 41 (via list node 47 and root node 42) and encounters data-type elements, namely "name 1" and "name 2". Accordingly, list node 49 creates data nodes 50 and 51 to contain the data-type elements, and updates its list of contained nodes to reflect creation of data nodes 50 and 52.

Data nodes 50 and 51 query the structured data 41 (via list nodes 49 and 47 and root node 42) for pointer tags to the corresponding data elements. The pointer tags are returned to the data nodes which store those pointers.

Because list node 49 created data nodes, it passes control back up to list node 47 which queries the structured data 41 for information. List node 47 encounters further structure, namely the "staff" structure and, accordingly, builds list node 52 and updates its list of contained nodes to reflect the newly built list node.

List node 52 queries the structured data 41 via root node 42 and encounters data-type elements, namely "name 3", "name 4" and "name 5". Accordingly, list node 52 creates data nodes 54, 55 and 56 to store pointer tags to those data-type elements. As described above, the data nodes query the data structure via root node 42 for pointer tags and store those pointer tags.

Because data nodes have been created, list node 52 returns control to list node 47 which queries data structure 41 via root node 42 for information. List node 47 encounters an end-of-data indication and returns control to root node 42 which generates a signal indicating that generation of the node network has been completed.

Although the list nodes shown in FIG. 4 contain only either list nodes or data nodes, in the most general case list nodes can contain both list nodes and data nodes at the same time. In this general case, nodes determine that they are finished processing when they reach incompatible data.

Figure 5:
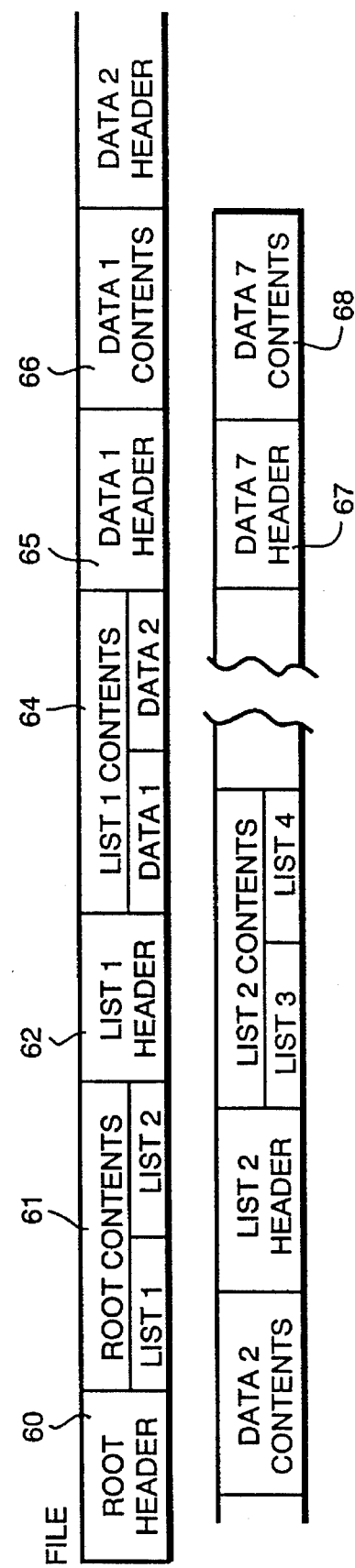
FIG. 5 is a representative view of output corresponding to the node network of FIG. 4.

In response to the completion signal, a command may be issued to root node 42 to write out the node to output 57. As described above, output 57 may be an ordinary data file, but it may also be a physical device such as a modem or an optical laser card storage device. In the case where output 57 is an ordinary data file, FIG. 5 is a representative view of the output generated by root node 42 in response to the write command. In more detail, in response to the write command, root node 42 generates a root header 60 and then writes out the root node contents, namely the list of nodes contained by the root node, at 61. Alternatively, rather than writing root node contents, the root node header can include a length code which stores the length of all information contained by the root node. Root node 42 then commands its children nodes to do the same, namely to write out a header and to write out their contents. Thus, as shown at 62, list node 44 writes out a header identifying itself and then writes out its contents as shown at 64, namely the list of nodes that it contains. Again, as an alternative to writing list node contents, the list node header can include a length code which stores the length of all information contained by the list node.

As mentioned above, list nodes only have the capability to communicate with parent nodes and do not have the capability to communicate with output. Accordingly, to write out its header and its contents, list node 44 communicates with its parent node, here root node 42, and requests for the parent node to execute the desired service. If the parent node can execute the service, it does so and, in this case, since root node 42 can output, it outputs the information requested by list node 44. If the parent node cannot execute the requested service, it passes the request upward to its parent until a node is encountered that can execute the requested service.

Reverting to FIG. 5, after list node 44 writes out its header and contents, it issues a command to its children to do the same, namely to write out a header and contents. Accordingly, as shown at 65, data node 45 writes out a data header and then, at 66 writes out its contents, namely a pointer tag to data elements 41b in structured data 41. The data header can also include a length code which stores the length of all information contained in the data node. The commands are passed upwardly until they reach root node 42, which writes out data node header 65. However, in response to the command to write out the data node's contents, root node 42 instead accesses the data elements 41b using the pointer tags supplied from the data node, and writes out the physical data contents at 66.

Processing continues until a header for data node 56 and the corresponding data are written to the output, as shown at 67 and 68, respectively.

The recipient of the file shown in FIG. 5 can recreate a facsimile reconstruction of the node network of FIG. 4 simply by detection of the header fields. Accordingly, there is no need for the recipient to be aware of the structure of the file or even to know whether or not particular structures exist. The recipient need only provide the capability of building a root node, list nodes and data nodes whose functions and capabilities mirror those of the sender's as depicted in FIGS. 1, 2 and 3. Once the node network is built on the recipient side, it is a simple matter to reconstruct the desired structured file from the input and even to customize the structure of the file for the specific purposes of the recipient.

Figure 6:
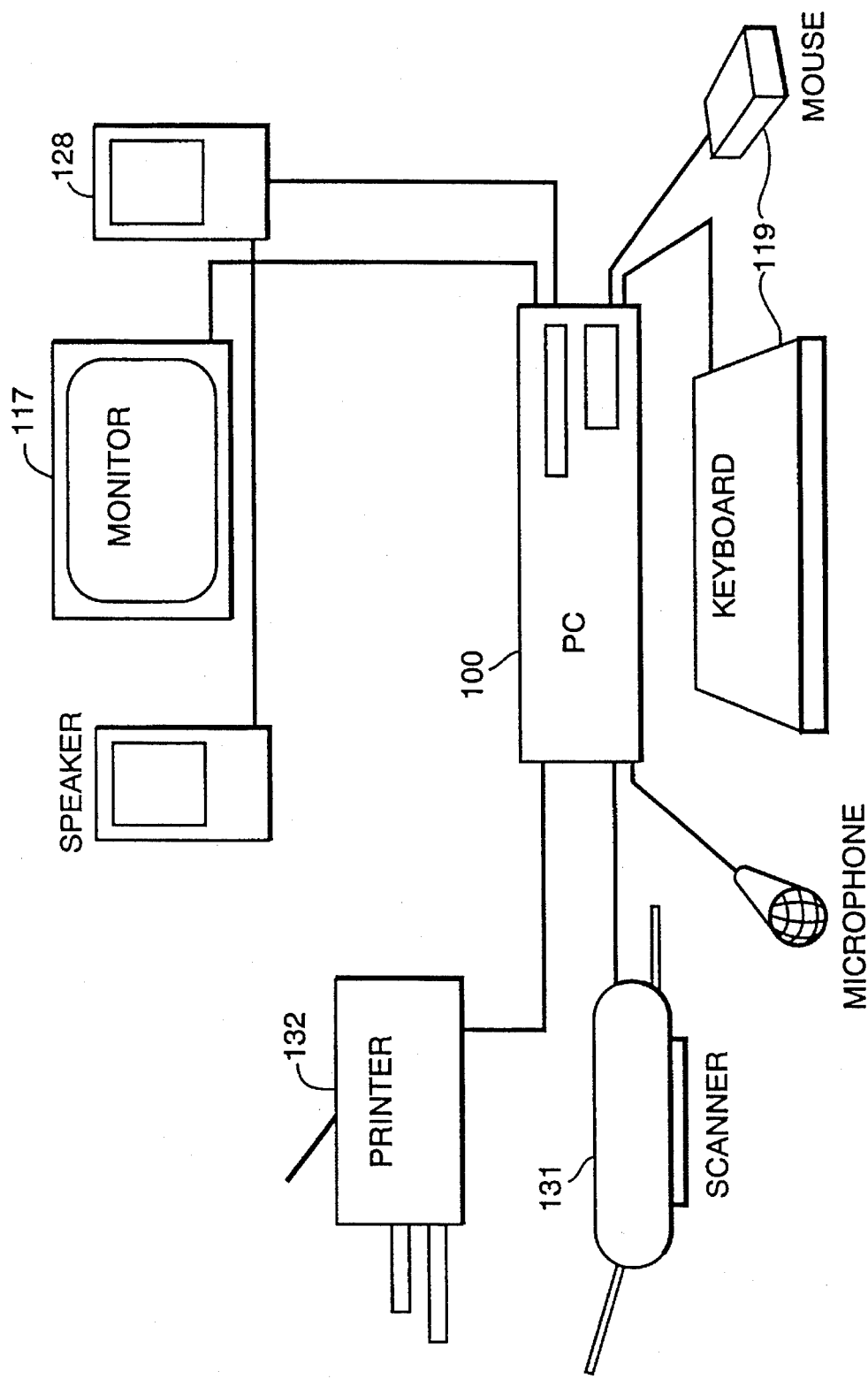
FIG. 6 is a perspective view of the outward appearance of an apparatus according to the invention.
Figure 7:
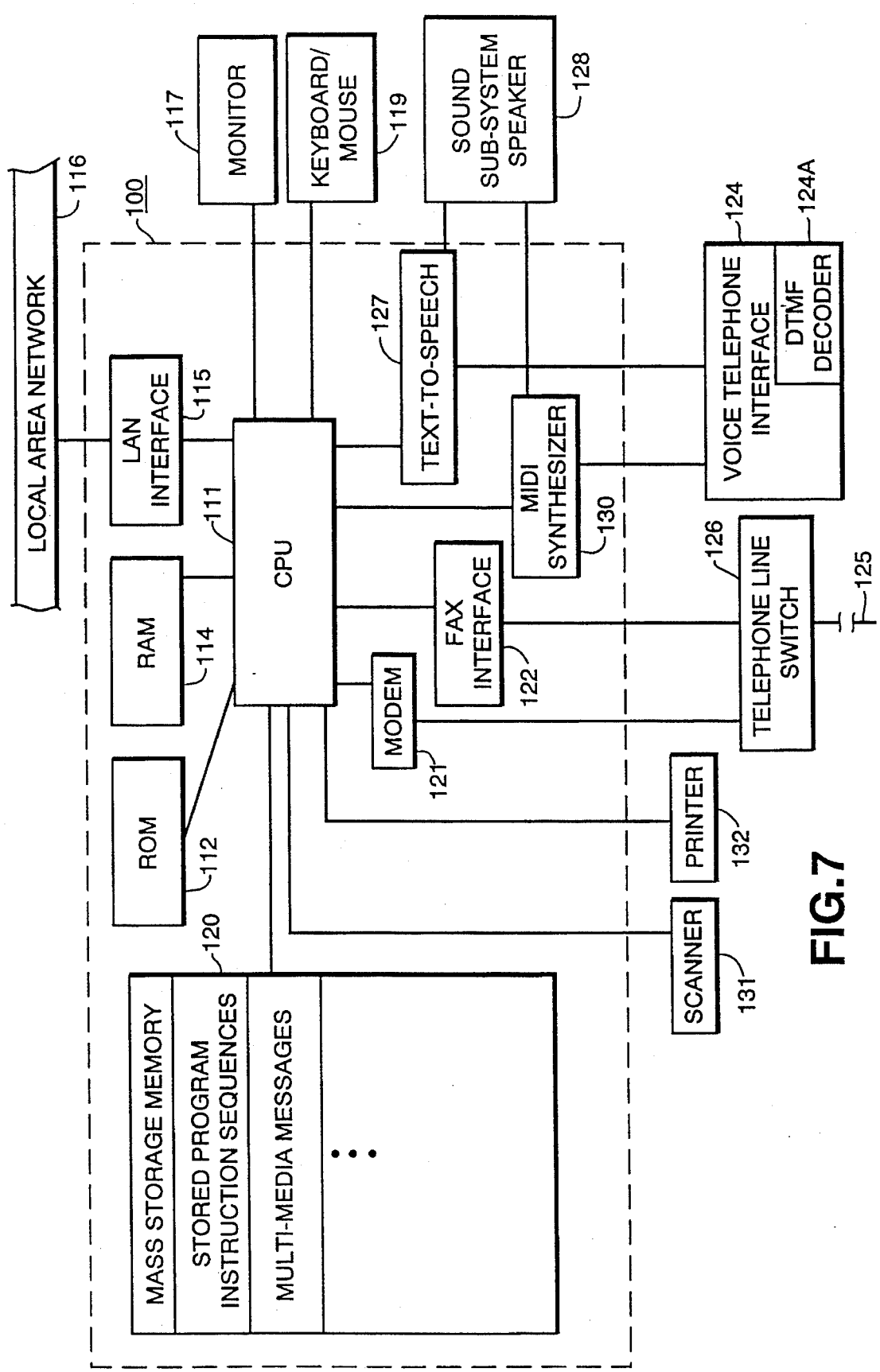
FIG. 7 is a block diagram of the FIG. 6 apparatus.

FIGS. 6 and 7 show an apparatus according to the present invention in which self-generating node networks are built for structured data comprised by multimedia messages. As shown in these figures, reference numeral 100 designates personal computing equipment such as an IBM PC or PC-compatible computer. While it is preferred to implement the invention in such personal computing equipment, it is to be understood that the invention may be incorporated into dedicated and/or stand-alone computing equipment.

Computing equipment 100 includes a CPU 111 such as an 80386 processor which executes stored program instructions such as operator selected applications programs that are stored in RAM 114 or specialized functions such as start-up programs or BIOS which are stored in ROM 112. Computing equipment 100 further includes a local area network interface 115 which provides interface to a local area network 116 whereby the computing equipment 100 can access files such as multi-media message files on a remote file server or send files for remote printing or otherwise interact with a local area network in accordance with known techniques such as by file exchange or by sending or receiving electronic mail. Computing equipment 100 further includes a monitor 117 for displaying visual aspects of multimedia messages and a keyboard/mouse 119 for allowing operator manipulation of areas on monitor 117 and inputting information.

Mass storage memory 120, such as a fixed disk or a floppy disk drive, is connected for access by CPU 111. Mass storage 120 typically includes stored program instruction sequences such as an instruction sequence according to the invention for building self-generating node networks, for creating, editing and displaying multi-media messages in a multimedia environment and for sending and receiving multimedia messages via different transmission media including facsimile, voice telephone and modem, as well as other stored program instruction sequences for executing application programs such as word processing application programs, optical character recognition programs, block selection applications programs, spreadsheet application programs, and other information and data processing programs. Mass storage memory 120 further includes multimedia messages stored as described below in connection with FIG. 8. Other data may be stored on mass storage memory 120 as desired by the operator.

A modem 121, a facsimile interface 122, and a voice telephone interface 124 are provided so that CPU 111 can interface to an ordinary telephone line 125. Each of the modem 121, facsimile interface 122, and voice telephone interface 124 are given access to the telephone line 125 via a telephone line switch 126 which is activated under control by CPU 111 so as to connect telephone line 125 to one of the modem 121, the facsimile 122, or the voice telephone interface 124, as appropriate to the data being sent and received on the telephone line. Thus, CPU 111 can send and receive binary data such as ASCII text files or document images files via modem 121, it can send and receive facsimile messages via facsimile interface 122, and it can interact on an ordinary voice telephone line via voice telephone interface 124. In this regard, voice telephone interface 124 is provided with a DTMF decoder 124A so as to decode tones on the voice telephone line 125 which correspond to operator depressions of a telephone keypad. In accordance with stored program instruction sequences in mass storage memory 120, the decoded tones are interpreted by CPU 111 into operator commands, and those operator commands are executed so as to take predesignated actions in accordance with operator depressions of the telephone keypad.

A conventional text-to-speech convertor 127 is connector to the CPU 111. The text-to-speech convertor 128 interprets text strings that are sent to it and converts those text strings to audio speech information. The text-to-speech convertor 127 provides audio speech information either to a speaker 128 for enunciation to a local computer operator, or provides audio speech information to the voice telephone interface 124 for enunciation over ordinary voice telephone lines.

MIDI ("Musical Instrument Digital Interface") synthesizer 130 is also connected to CPU 111 and interprets MIDI music commands from CPU 111 so as to convert those MIDI music commands to audio wave forms. The audio wave forms are, in turn, played out over speaker 128 or provided to voice telephone interface 124 for play out over ordinary voice telephone lines.

Scanner 131 operates to scan original documents printed on a sheet of paper, and to convert the information of those original documents into a bit-by-bit computer readable representation of that document. Scanner 131 may be a simple black and white scanner, but more preferably scanner 131 includes at least half-tone (grey scale) processing capabilities and/or color processing capabilities.

Printer 132 is provided to form images of documents under the control of CPU 111. Printer 132 may be an ordinary black and white printer, but, more preferably, printer 132 includes half-tone and/or color capabilities.

Figure 8:
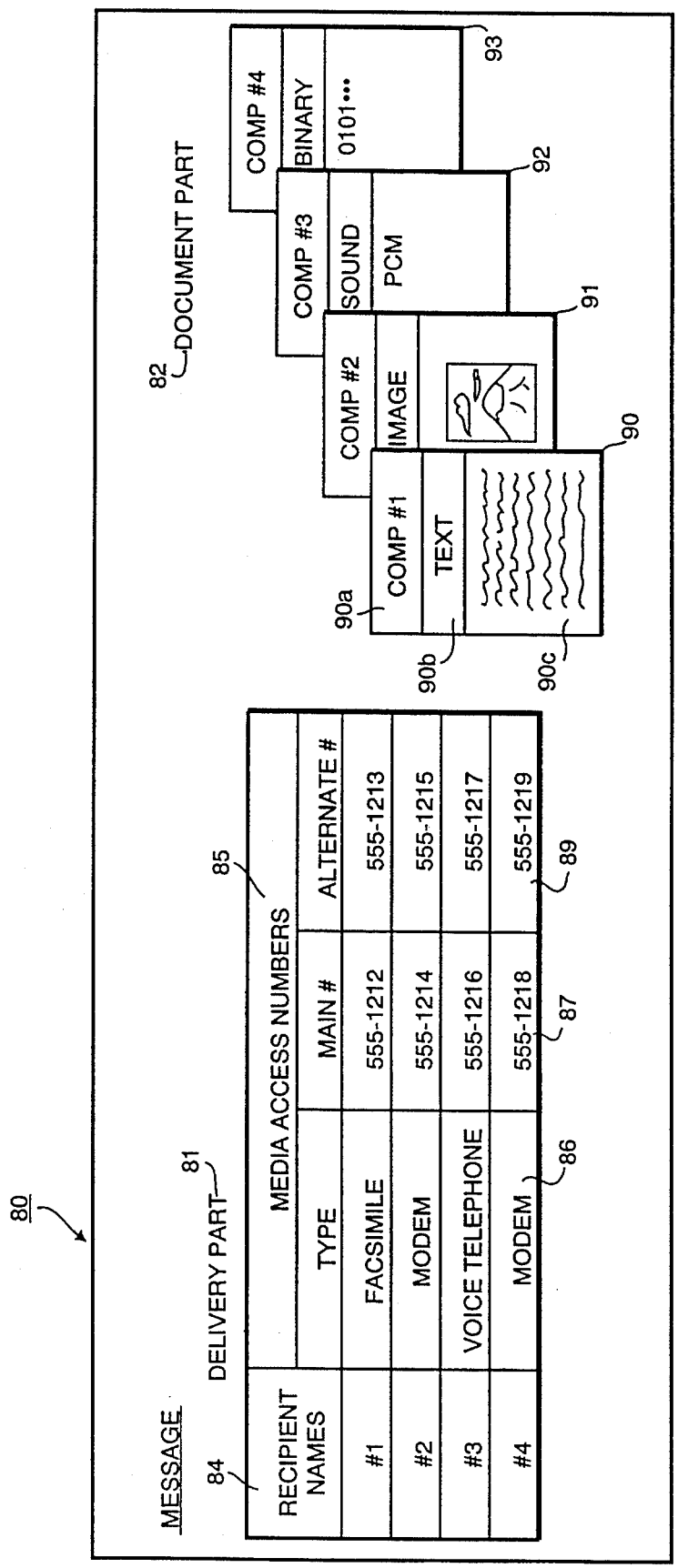
FIG. 8 is a representative view of structured data comprising a multimedia message.

FIG. 8 is a representational view of how multimedia messages are stored in structured data. FIG. 8 shows a single multimedia message 80 which includes a delivery part 81 specifying the recipients of the message and the media by which the message is delivered, and a document part 82 which specifies the contents of the multimedia message. In more detail, delivery part 81 includes plural recipient names 84 together with media access numbers 85 by which those recipients may be reached. Each media access number has associated with it a media type 86, for example, facsimile, modem, voice telephone, etc., as well as a main media access number 87, and alternate numbers 89 which are to be tried in the event that the main number is not available. While delivery part 81, as illustrated in FIG. 8, indicates that each recipient can receive the multimedia message only by a single type of medium, it is possible for the delivery part to specify plural different types of media by which the message may be delivered to each recipient, for example, a different medium for different parts of the message.

Document part 82 includes plural document components such as component 90, 91, 92 and 93. Each component includes a component identifier, a component type, and the data for the component. Thus, component 90 includes a component identifier 90a (here, "component #1"), a component type 90b (here, "text"), as well as the associated component data 90c.

In accordance with techniques described in U.S. application Ser. No. 07/808,757 filed Dec. 17, 1991 entitled "METHOD AND APPARATUS FOR SENDING AND RECEIVING MULTIMEDIA MESSAGES", the contents of which are incorporated herein by reference, computing equipment 100 can create, display and edit multimedia messages such as those shown in FIG. 8 and can send and receive those multimedia messages electronically via different transmission media including facsimile interface 122, modem 121 and voice telephone interface 124.

In accordance with the present invention, a self-generating node network representing the structure of the multimedia message shown in FIG. 8 may be constructed and the node network may be used to transmit the multimedia message to a recipient in such a manner that the structure of the multimedia message is preserved.

Figure 9:
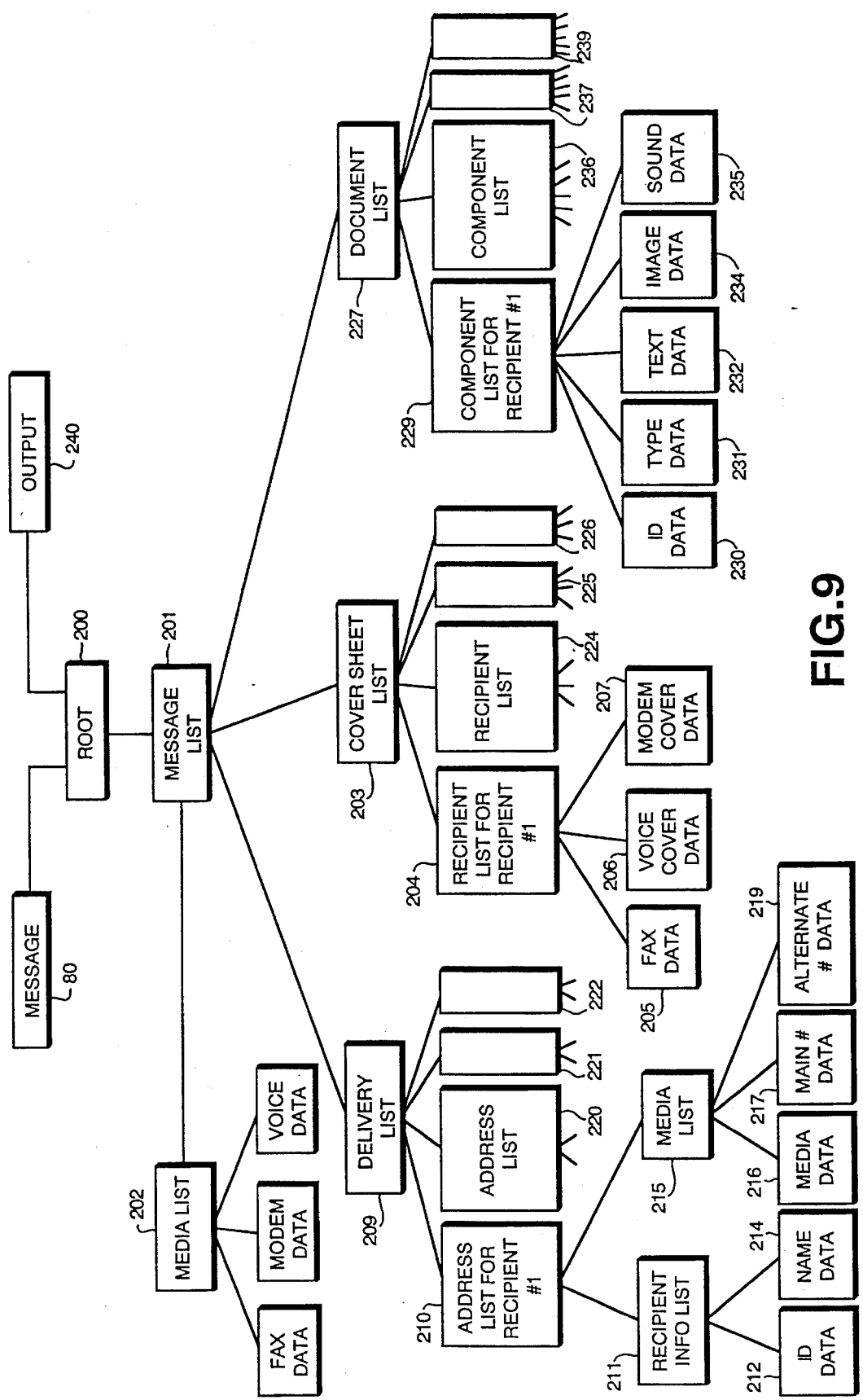
FIG. 9 is a representative view of a self-generating node network constructed in accordance with the structured data shown in FIG. 8.

A representative self-generating node network which corresponds to message 80 of FIG. 8 is shown in FIG. 9. The self-generating node network of FIG. 9 is generated in accordance with stored program instructions stored in mass storage 120 and executed out of RAM 114 by CPU 111.

As described above in connection with FIG. 4, building the self-generating node network commences with creation of the root node 200. Root node 200 queries message 80, and in accordance with whether structural elements or data elements are encountered creates either list nodes or data nodes, as described above. In the present circumstances, root node 200 encounters a message element and, accordingly, creates a message list node 201. Message list node 201 is similar to list nodes described above in connection with FIG. 2, but additionally includes customized features. In the present instance, message list node 201 includes customized process steps that create a media list node 202 and a cover sheet list node 203. The media list node 202 contains data nodes that store the various media that are encountered during processing of the message 80. Thus, these nodes store all the media that are needed for message transmission.

Cover sheet list node 203 stores cover sheet information for each recipient. More particularly, for each recipient, cover sheet list node 203 creates a recipient list node such as recipient list node 204, and creates a cover sheet data node for that recipient. Each different medium requires a differently formatted cover sheet, so that as the media list is created by media list 202, a different format cover sheet is created for each recipient list node 204. Thus, as shown in FIG. 9, a facsimile cover sheet data node 205 has been created, as well as voice cover sheet data node 206 and modem cover sheet data node 207.

After creating the specialized media list node 202 and the cover sheet list node 203, message list node 201 queries message 80. In the embodiment described here as in those described above, list nodes and data nodes do not include communication capabilities to the message 80 and so the query is passed up through each node to root node 200. To speed the query process, however, it is possible to provide list and/or data nodes with direct communication capabilities to message 80 so as to bypass the need to communicate via root node 200.

In response to the query, message list node 201 encounters further structure in the form of delivery part 81 and, accordingly, creates delivery list node 209 for storing the delivery part structure and updates its list of contained nodes. Delivery list node 209 in turn, queries message 80 via root node 200 and encounters structure in the form of addresses for individual recipients. Accordingly, delivery list node 209 forms an address list node 210 to store the address structure for each recipient. Address list node 210 in turn, queries message 80 and encounters further structure in the form of recipient information. Accordingly, address list node 210 builds recipient information list node 211 to store the recipient information structure. Recipient list node 211 queries the message 80 and encounters data in form of recipient identification data and recipient name. Accordingly, recipient information list node 211 forms ID data node 212 and name data node 214 to store printer tags to that data within message 80.

After recipient information list node 211 forms data nodes, it returns control to its parent list node, here address list node 210. Address list node 210 queries message 80 and encounters additional structure in the form of media access numbers, and accordingly builds media list node 215. Media list node 215 queries message 80 via root node 200 and encounters data in the form of the media type, the main access number and the alternate access numbers. Accordingly, media list node 215 forms media data node 216, main access data number node 217, and alternate access data number node 219.

After creating data nodes, media list node 215 returns control to address list node 210 which queries message 80 via root node 200 and determines that there is no additional structure or data for the recipient structure contained by the list node. Accordingly, control is returned to delivery list node 209 which queries message 80 via root node 200 which goes on to build address list nodes 220, 221 and 222, in correspondence to each of remaining recipients #2, #3 and #4, together with all the corresponding sub-node structure.

During processing of the recipient information, message list node 201, using its customized functions, monitors data transmissions between message 80 and media list node 215. When a transmission is detected which contains a medium type, message list node 201 causes media list node 202 to build a data node corresponding to the detected medium. Accordingly, after processing delivery part 81, media list node 202 contains data nodes in correspondence to each of the different media that will be needed for each of the different media that are listed in the delivery part 81.

Likewise, during communications between root node 200 and each of address list nodes 210, 220, 221 and 222, message list node 210 monitors those communications, using its customized functions, to determine when a new address list node has been added for each additional recipient. When an additional recipient is detected, message list node 210 causes cover sheet list node 203 to add a recipient list node such as recipient list node 204. After all recipients in the delivery part 81 have been processed, each recipient list node 204, using its customized functions, creates cover sheet data nodes in correspondence to each of the media listed under media list node 202. Thus, as shown in FIG. 9, recipient list node 204 corresponding to recipient #1 contains a facsimile sheet cover data node 205, a voice telephone cover sheet data node 206 and a modem cover sheet data node 207. Similar cover sheets, addressed to each particular recipient, are also formed for the other recipients as indicated schematically at recipient list nodes 224, 225 and 226, each of which includes similar sub-nodes.

Also after delivery list node 209 finishes processing delivery part 81, it returns control to message list node 201 which queries message 80. Message list node 201 encounters further structure in the message in the form of document part 82, and therefore builds document list node 227 to contain that structure. Document list node 227 queries message 80 via root node 200 and encounters further structure in the form of each of the individual components of the document. Accordingly, document list node 227 forms a component list node 229 to store the structure for component #1. Component list node 229 queries message 80 via root node 200 and encounters data type elements in the form of component identification data 90a for component #1, component type 90b, and component contents 90c. Accordingly, component list node 229 builds identification data node 230 to store a pointer tag to component identification 90a, type data node 231 to store a pointer tag to type data 90b, and text data node 232 to store a pointer tag to text 90c. In addition, using customized functions provided in text data node 232, text data node 232 queries the media lists contained in media list node 202. For each medium encountered, text data node 232 performs type conversion of the data tagged therein so that data compatible with each transmission medium is stored under component list node 229. Conversion is conducted in accordance with the following table:

| | | Conversion Table OUTPUT | | | |
|---|---|---|---|---|---|
| | | Text | Image | Sound | Binary |
| I N P U T | Text | Yes | Yes | Yes (speech synthesis) | Yes |
| | Image | Yes (OCR) | Yes | Yes (OCR plus speech synthesis) | Yes |
| | Sound | No | No | Yes | No |
| | Binary | No | No | No | Yes |

It is to be noted that the conversion table is specified in accordance with existing conversion technology. Thus, for example, it is currently possible to convert an image component which includes images of text into an equivalent text component using optical character recognition technology, and further to convert such a text file into a sound file using speech synthesis technology. Current conversion techniques do not permit, for example, conversion of sound files into text files. Research is currently underway into such conversions, and it may become possible to convert sound files that include spoken words into equivalent text files. As those conversion technologies become more widely available, the conversion table may be updated appropriately.

Thus, reverting to FIG. 9, text data node 232 generates image data node 234 and sound data node 235. Those new data nodes are passed to component list node 229 with instructions to add them as children to component list node 229. Image data node 234 simply contains image-equivalent data for text data node 232, and sound data node 235 simply includes text-to speech converted sound file, such as a pulse code modulated ("PCM") file. In those instances where conversion is not possible, the data node in question stores an "unconvertible" icon of the appropriate type so that there is some indication to the recipient of the message that part of the message has not been transmitted because there is no equivalent format for the selected transmission medium.

In like manner, document list node 227 queries message 80 via root node 200 and forms corresponding component list nodes 236, 237 and 239, together with all corresponding sub-node structure, in correspondence to components 91, 92 and 93.

After the FIG. 9 node network has generated itself, it issues a completion signal indicating that generation is complete. Commands may then be issued to the node network, for example, to write out the node network to output 240. As described above in connection with FIGS. 4 and 5, commands to write the node network are issued to root node 200. In response to a command to write the network, root node 200 writes out a root node header and either a length core or the nodes contained in the root node, here message list node 201. Root node 200, in turn, commands each of its child nodes to do the same, namely, write out a node header and write out either a length code or the contents of the node. Thus, message list node 201 writes out a list node header and writes out its contents, here, a list of the nodes that it contains (media list node 202, cover sheet list node 203, delivery list node 209 and document list node 227). As described above in connection with FIGS. 4 and 5, since only root node 200 can output to output 240, message list node 201 writes itself out by passing commands to write itself out upward to root node 200. Message list 201, in turn, instructs each of its children nodes to write out node headers and node contents. Flow proceeds until the entire node network has written itself out to output 240. It should be noted that output 240, while ordinarily a data file such as a RIFF data file, may also be a physical device such as a modem or laser optical disk card, whereby the process of writing out the node network results in communication of the node network, for example, over modem 121.

It is also possible to issue a command to root node 200 to read out nodes that are selected in accordance with selection criteria. In accordance with that selection criteria, only parts of the node network are written to output 240. In this case, each of the list nodes and the data nodes are provided with customized processing functions whereby they can determine whether they meet the selection criteria.

According to this aspect of the invention, for example, facsimile interface 122 may be designated as a physical device to receive output 240. The root node is then instructed to write itself out with the selection criteria of writing out only facsimile-based messages. Root node 200 writes itself to facsimile interface 122 and, in turn, instructs each of its children nodes to write itself to facsimile 122 (via the root node) if the node meets the selection criteria (i.e., facsimile-based medium). By virtue of this arrangement, it is possible for the node network to transmit facsimile-based media directly from the node network to the facsimile interface.

At the recipient side, the node network creation process is mirrored whereby the recipient can build a facsimile reconstruction of the self-generating node network of FIG. 9 simply by detection of the header fields. Accordingly, there is no need for the recipient to be aware of the structure of the file or even to know whether or not particular structures exist. Once the node network is built on the recipient side, it is a simple matter to reconstruct the desired structured file from the input and even to customize the structure of the file for the specific purposes of the recipient.

What is claimed is:

1. A method for creating a self-generating node network from structured data, the structured data having data-type elements and structural-type elements, the method comprising the steps of:

building a root node, the root node including communication capabilities with the structured data and with output means, and the root node further including process steps to build both (1) data nodes which include pointer tags to data, and (2) list nodes which contain other list nodes and data nodes and which include process steps to build those other list nodes and data nodes, both the list nodes and the data nodes including communication capabilities with immediate parent nodes and children nodes;

querying the structured data from the root node and building a list node or a data node in accordance with whether a data-type element or a structural-type element is encountered;

wherein in a case where a data-type element is encountered, a data node is built to store a pointer tag for the data type element; and wherein in a case where a structural-type element is encountered, a list node is built which can issue further queries to the structured data via the root node; and continuing to query the structured data via the root node from one of either the root node and a list node, with the one of the root node and the list node building further list nodes and data nodes in accordance with whether a data-type element or a structural-type element is encountered, said continuing to query step continuing until all of the structured data has been queried.

2. A method according to claim 1, further comprising the step of manipulating data tagged by data nodes to create new data nodes which are contained by a common list node.

3. A method according to claim 2, wherein each data node includes manipulation capabilities and wherein said manipulation step is performed by respective data nodes.

4. A method according to claim 1, wherein the list nodes and the data nodes include customized functionality tailored to meet characteristics of the data-type elements and the structural-type elements encountered in the structured data.

5. A method according to claim 4, wherein the customized functionality includes functionality to communicate with the structured data.

6. A method according to claim 4, wherein the customized functionality of a data node includes functionality to manipulate data tagged by the data node.

7. A method according to claim 1, further comprising the step of instructing the root node to write its contents selectively to file in accordance with selection criteria.

8. A method according to claim 7, wherein the root node writes its contents and then, in turn, instructs nodes contained in the root node to write their contents in accordance with the selection criteria.

9. A method according to claim 8, wherein nodes contained in the root node write their contents via the root node in a case where they meet the selection criteria.

10. A method according to claim 9, wherein a data node writes a header and writes data from the structured data in accordance with the pointer tag in the data node in the case where the data node meets the selection criteria.

11. A method according to claim 9, wherein a list node writes a header and, in turn, instructs contained nodes to write their contents in a case where the list node meets the selection criteria.

12. A method according to claim 11, wherein the header includes a length code.

13. A method according to claim 11, wherein the list node also writes a list of the nodes it contains.

14. A method according to claim 11, wherein contained nodes write their contents through respective list nodes.

15. A method according to claim 1, further comprising the step of instructing the root node to write its contents to the output means.

16. A method according to claim 15, wherein in response to an instruction to write its contents to the output means, the root node writes its contents and then, in turn, instructs nodes contained in the root node to write their contents to the output means.

17. A method according to claim 16, wherein contained nodes write their contents through respective list nodes.

18. A method according to claim 16, wherein contained nodes write their contents to the output means via the root node.

19. A method according to claim 18, wherein a data node writes a header and writes data from the structured data to output means in accordance with the pointer tag.

20. A method according to claim 18, wherein a list node writes a header to the output means and, in turn, instructs contained nodes to write their contents to the output means.

21. A method according to claim 20, wherein the header includes a length code.

22. A method according to claim 20, wherein the list node also writes a list of the nodes it contains.

23. A method according to claim 20, wherein contained nodes write their contents via respective list nodes.

24. A method for creating a self-generating node network from input, the input having data-type headers and list-type headers, the method comprising the steps of:

building a root node, the root node including communication capabilities with structured data and with the input, and the root node further including process steps to build both (1) data nodes which include pointer tags to data, and (2) list nodes which contain other list nodes and data nodes and which include process steps to build those other list nodes and data nodes, both the list nodes and the data nodes including communication capabilities with immediate parent nodes and children nodes;

reading the input with the root node and building a list node or a data node in accordance with whether a data-type header or a list-type header is encountered;

wherein in a case where a data-type header is encountered, a data node is built to store a pointer tag for the input; and wherein in a case where a list-type header is encountered, a list node is built which can accept further input via the root node; and continuing to read the input with the root node, with one of either the root node and a list node building further list nodes and data nodes in accordance with whether a data-type header or a structural-type header is encountered, said continuing to read step continuing until all of the input has been read.

25. A method according to claim 24, further comprising the step of manipulating data tagged by data nodes to create new data nodes which are contained by a common list node.

26. A method according to claim 25, wherein each data node includes manipulation capabilities and wherein said manipulation step is performed by respective data nodes.

27. A method according to claim 24, wherein the list nodes and the data nodes include customized functionality tailored to meet characteristics of the data-type headers and the list-type headers encountered in the input.

28. A method according to claim 27, wherein the customized functionality includes functionality to communicate with the input.

29. A method according to claim 27, wherein the customized functionality of a data node includes functionality to manipulate data tagged by the data node.

30. A method according to claim 24, further comprising the step of instructing the root node to write its contents selectively to structured data in accordance with selection criteria.

31. A method according to claim 30, wherein the root node writes its contents and then, in turn, instructs nodes contained in the root node to write their contents in accordance with the selection criteria.

32. A method according to claim 31, wherein nodes contained in the root node write their contents via the root node in a case where they meet the selection criteria.

33. A method according to claim 32, wherein a data node writes to structured data in accordance with a header from input and writes data from the input in accordance with the pointer tag in the data node in the case where the data node meets the selection criteria.

34. A method according to claim 32, wherein a list node writes structured data in accordance with a header from input and, in turn, instructs the contained nodes to write their contents in a case where the list node meets the selection criteria.

35. A method according to claim 34, wherein the header includes a length code.

36. A method according to claim 34, wherein the list node also reads a list of the nodes it contains.

37. A method according to claim 24, further comprising the step of instructing the root node to write its contents to the structured data.

38. A method according to claim 37, wherein in response to an instruction to write its contents to structured data, the root node writes its contents and then, in turn, instructs nodes contained in the root node to write their contents to structured data.

39. A method according to claim 38, wherein contained nodes write their contents via the root node.

40. A method according to claim 39, wherein a list node writes to structured data in accordance with a header from input and, in turn, instructs contained nodes to write their contents to structured data.

41. A method according to claim 39, wherein a data node writes to structured data in accordance with a header from input and writes data from the input in accordance with the pointer tag.

42. A method according to claim 41, wherein the header includes a length code.

43. A method according to claim 41, wherein the list node also reads a list of the nodes it contains.

44. A method according to claim 41, wherein contained nodes write their contents via respective list nodes.

45. An apparatus for creating and outputting a self-generating node network from structured data which includes structural-type elements and data-type elements, comprising:

a memory including a first memory region for storing the structured data, and a second memory region for storing (1) program instructions for building a root node for the self-generating node network, (2) a root node containing (i) process steps for building list nodes, (ii) process steps for building data nodes, and (iii) process steps for querying the structured data, (3) list nodes, each of which contains (i) process steps for building list nodes, (ii) process steps for building data nodes, and (iii) process steps for querying structured data and (4) data nodes, each of which contains (i) pointer tags to structured data and (ii) process steps for manipulating tagged data; and a processor for (1) building a root node by executing the program instructions for building a root node, (2) querying the structured data from the root node by executing the process steps for querying the structured data contained in the root node, (3) building a list node by executing the process steps for building a list node contained in the root node and building a data node by executing the process steps for building a data node contained in the root node in accordance with whether a date-type element or a structural-type element is encountered in the structured data, (4) continuing to query the structured data from the root node by continuing to execute the process steps for querying the structured data contained in the root node and in a case where a list node has been built, continuing to query the structured data from the list node by continuing to execute the process steps for querying the structured data contained in the list node until all of the structured data has been queried, and (5) continuing to build list nodes and data nodes by continuing to execute one of either the process steps for building a list node and the process steps for building a data node, contained in one of the root node and a list node in the case where a list node has been built, in accordance with whether a data-type element or a structural-type element is encountered in the structured data;

wherein in a case where a data-type element is encountered, stored process steps for building a data node are executed; and wherein in a case where a structural-type element is encountered, stored process steps for building a list node are executed.

46. An apparatus according to claim 45, wherein list nodes query the structured data via the root node.

47. An apparatus according to claim 45, wherein list nodes contain a list of contained nodes, and wherein the root node contains a list of contained nodes.

48. An apparatus according to claim 45, wherein the processor manipulates tagged data contained in a data node to build new data nodes which are contained in a common list node by executing process steps for manipulating tagged data contained in the data node.

49. An apparatus according to claim 45, wherein the processor sends a write command to the root node to output the node network and wherein the root node outputs the node network in a predetermined order.

50. An apparatus according to claim 49, wherein the predetermined order includes outputting nodes contained in the root node, then, in a case that there are no list nodes contained in the root node, outputting structured data according to the pointer tags to the structured data contained in data nodes, and in a case that there are list nodes contained in the root node, for each list node, outputting its children list nodes until a data node is output, and repeating the process until all structured data has been output.

51. An apparatus according to claim 50, wherein each node contains a header, and wherein, for each node, the node's header is output before its contents are output.

52. A method for creating and outputting a self-generating node network stored in a hierarchical tree structure from structured data which includes structural-type elements and data-type elements, comprising the steps of:

generating a root node, capable of communicating with the structured data and of outputting the generated node network, which stores process steps for generating further nodes, a list of nodes contained in the root node, and process steps for querying the structured data;

sending a query from the root node to the structured data, the query being created by the root node according to the process steps for querying the structured data stored in the root node;

in a case where a data-type element is encountered by the query, generating a data node from the process steps for generating further nodes stored in the root node, the data node (1) storing pointer tags to the structured data and process steps to manipulate the tagged data, and (2) including process steps to communicate with a parent node for that data node;

in a case where a structural-type element is encountered by the query, generating a list node from the process steps for generating further nodes stored in the root node, the list node (1) storing process steps for generating further nodes, a list of nodes contained in the list node, and process steps for querying the structured data, (2) communicating with its parent node and its children nodes, (3) querying the structured data via the root node, and (4) generating one of a data node and a list node based on a response to the query;

issuing a completion signal to indicate that a node network has been generated from the structured data;

sending a command to the root node for the root node to output the node network; and outputting the node network, through the root node, in the following predetermined order: (1) a root node header, (2) children nodes of the root node, and (3) for each child node of the root node, (i) a header, and (ii) the child node's children nodes if the node is a list node, and structured data if the node is a data node.

\* \* \* \* \*